United States Patent [19]
Kersten et al.

[11] Patent Number: 5,465,310
[45] Date of Patent: Nov. 7, 1995

[54] OPTICAL HYBRID SWITCH WITH ELECTROPTICALLY ACTIVE WAVEGUIDE STRUCTURE FORMEDFROM AN NLO POLYMER

[75] Inventors: Peter Kersten, Leonberg; Klaus-D. Matthies, Möglingen, both of Germany

[73] Assignee: Alcatel N.V., Amsterdam, Netherlands

[21] Appl. No.: 228,085

[22] Filed: Apr. 15, 1994

[30] Foreign Application Priority Data

Apr. 17, 1993 [DE] Germany .......................... 43 12 568.9

[51] Int. Cl.$^6$ ........................................................ G02B 6/26
[52] U.S. Cl. ............................... 385/22; 385/50; 385/16; 385/14
[58] Field of Search ...................... 385/22, 16, 14, 385/15, 40, 45, 50, 31, 39, 42

[56] References Cited

U.S. PATENT DOCUMENTS

| | | | |
|---|---|---|---|
| 4,728,167 | 3/1988 | Soref et al. | 385/16 |
| 4,753,505 | 6/1988 | Mikamo et al. | 385/5 |
| 4,759,595 | 7/1988 | Board et al. | 385/22 |

(List continued on next page.)

FOREIGN PATENT DOCUMENTS

| | | | |
|---|---|---|---|
| 0241967 | 10/1987 | European Pat. Off. | |
| 0367682 | 5/1990 | European Pat. Off. | 385/16 |
| 4116470 | 11/1992 | Germany . | |
| 4115078 | 11/1992 | Germany . | |
| 561927 | 6/1977 | U.S.S.R. . | |
| 739461 | 6/1980 | U.S.S.R. . | |
| 1211683 | 2/1986 | U.S.S.R. . | |
| 1295926 | 7/1991 | U.S.S.R. . | |
| 2559580 | 3/1993 | United Kingdom | 385/16 |
| 8805995 | 8/1988 | WIPO . | |

OTHER PUBLICATIONS

Patent Abstracts of Japan, vol. 015, No. 214 (P-1209) 31, May 1991 & JP-A-03 059 546 (Fujitsu Ltd) 14 Mar. 1991.
Japanese Journal of Applied Physics, Letters. Bd. 31, Nr. 88, Aug. 1992, Tokyo JP Seiten L1180—L1181— "Directional–coupled optical switch between stacked waveguide layers using electro–optic polymer".
Applied Physics Letters, Bd. 63, Nr. 9, Aug. 1993, New York US Seiten 1161—1163, XP000394498 Hikita M et al. "Optical intensity modulation in a vertically stacked coupler incorporating electro-optic polymer".
Patent Abstracts of Japan, vol. 017, No. 669 (P-1657) 9 Dec. 1993 & JP-A-05 224 245 (NEC Corp) 3 Sep. 1993.
Masuda, Masamitsu; YIP, Gar Lam: An optical TE–TM mode splitter using a LiNbO–3–branching waveguie In: Applied Physics Letters, vol. 37, No. 1, Jan. 7, 1980, S. 20–22.
Papuchon, M. u.a.: Electrically switched optical directional coupler: Cobra. In: Applied Physics Letters, vol. 27, No. 5, 1, Jan. 9, 1975, S.289–291.
N. N.: Integrated Optics 4×4 Switch Matrix with Digital Optical Switches. In: Electronics Letters, vol. 26, No. 1, Jan. 4, 1990, S.4,5.

Primary Examiner—John D. Lee
Assistant Examiner—Phan T. H. Palmer
Attorney, Agent, or Firm—Ware, Ressola, Van Der Sluys & Adolphson

[57] ABSTRACT

An optical hybrid switch is indicated, which guides a voltage-controlled light flux supplied by an incoming passive optical waveguide (1), to at least one of two outgoing passive optical waveguides (1, 1a). The hybrid switch according to the invention preferably uses a NLO-polymer as the electro-optically active elements. The increased attenuation linked to the use of NLO-polymer is kept low by extending the incoming optical waveguide (1) without interruption as one of the outgoing optical waveguides. To steer the light flux to the other outgoing optical waveguide (1a), the light is coupled out from an electro-optically active waveguide structure (5) by an adjustable coupler (6), and coupled to the other outgoing passive waveguide (1a) through another fixed adjustment coupler (8).

8 Claims, 1 Drawing Sheet

U.S. PATENT DOCUMENTS

| | | | |
|---|---|---|---|
| 4,932,736 | 6/1990 | Su | 385/22 |
| 4,934,776 | 6/1990 | Koai | 385/2 |
| 4,998,791 | 3/1991 | Koai | 385/22 |
| 5,002,350 | 3/1991 | Dragone | 385/24 |
| 5,033,811 | 7/1991 | Yanagawa et al. | 385/16 |
| 5,136,671 | 8/1992 | Dragone | 385/46 |
| 5,303,315 | 4/1994 | Granestrand | 385/16 |

OPTICAL HYBRID SWITCH WITH ELECTROPTICALLY ACTIVE WAVEGUIDE STRUCTURE FORMEDFROM AN NLO POLYMER

TECHNICAL FIELD

The invention concerns an optical hybrid switch.

BACKGROUND OF THE INVENTION

Such a switch is e.g. known from the technical journal "*Electronic Letters*", volume 26, no. 1, pages 4 and 5, (publication date Jan. 4, 1990).

The basic element of a switching matrix shown there in FIG. 3 is a switch per FIG. 1, made of Ti: Li Nb $O_3$. Such a switch consists of a forked optical waveguide, whose fork fines are flanked by laterally and centrally-located electrodes, of which the central one has an extension that overlaps the narrow fork area. Because of the nonlinear optical characteristics of the Ti: Li Nb $O_3$, e.g. a dependency of the index of refraction on the strength of the applied electrical field, light that is routed to the switch from the non-branched side can either be guided exclusively into one or the other fork tine by applying preset voltages to the electrodes, or can be distributed to both fork fines at a predetermined ratio.

The light distribution takes place according to the principle of the optical directional coupler, which is described in more detail e.g. in "*Applied Physical Letters*", volume 27, no. 5, Sep. 1, 1975, page 289 and on.

The waveguide structure forming the optical switch, which consists of optically nonlinear material, must be produced in or on a mechanically stable carrier, e.g. a substrate, which cannot be produced in any desired size. The known switch must therefore be coupled to passive waveguides via other couplers not depicted in FIG. 1, preferably with a fixed adjustment, which serves to supply and guide the light flux to be distributed. If we consider configurations in which several switches are integrated on a single substrate, each switch has four couplers, three of which are used to connect to passive optical waveguides.

If an easily handled optical nonlinear material is to be used instead of Ti: Li Nb $O_3$, an NLO-polymer is suitable. However, it has a higher attenuation than Li Nb $O_3$, so that the losses that occur in the couplers and in the waveguide paths made of NLO-polymer significantly determine the total attenuation of the optical switch.

SUMMARY OF THE INVENTION

It is therefore the task of the invention to create an optical switch of the kind mentioned in the beginning, which requires as low a number of couplers as possible to operate, and whose total length of waveguide paths made of optically nonlinear material is reduced to a minimum.

This task is fullfiled by an optical hybrid switch, wherein the incoming passive optical waveguide (1) continues without interruption as one of the outgoing waveguides, and that the electro-optically active waveguide structure (5) combines, on the one hand, with the continuous passive optical waveguide (1) to form a coupler (6) adjustable by applying a voltage and acting as an optical switch and, on the other hand, with the other outgoing waveguide (1a) to form a fixed coupler (8).

Due to the configuration of a controllable hybrid coupler, the incoming passive optical waveguide on the non-branched side of the optical switch can be conducted without interruption as an outgoing passive optical waveguide, which saves two of the three fixed adjustment couplers. In addition, the waveguide structure required outside of the couplers, which consists of nonlinear optical material, is limited to the very short path between the controllable coupler and the coupler required for coupling to the still free coupler needed by the passive optical waveguide, which permits the use of lower priced and easily handled optically nonlinear materials, such as e.g. NLO-polymer, even if they have higher attenuation.

The present invention further describes the use of NLO-polymer in the electro-optically active waveguide structure. NLO-polymers and their use are known e.g. from the technical book "*Polymers for Lightwave and Integrated Optics*" by L. A. Hornak, DEKKAER, New York, 1992.

The present invention also describes a variation that is technically easy to realize, in which the passive waveguides are imbedded in the substrate and an active electrooptical structure deposited on the substrate as a ribbed waveguide forms vertical couplers with the imbedded passive waveguides.

Another variation with parallel couplers is characterized in that the passive optical waveguides and the electro-optically active structure are embedded in the substrate and lie in the same plane, and that electrodes are provided above and below the optically active structure.

Finally, the present invention also describes the use of the optical hybrid switch in a cascaded optical switching matrix.

BRIEF DESCRIPTION OF THE DRAWINGS

An optical hybrid switch according to the invention will now be explained in detail by means of two figures.

BEST MODE FOR CARRYING OUT THE INVENTION

Figure 1:
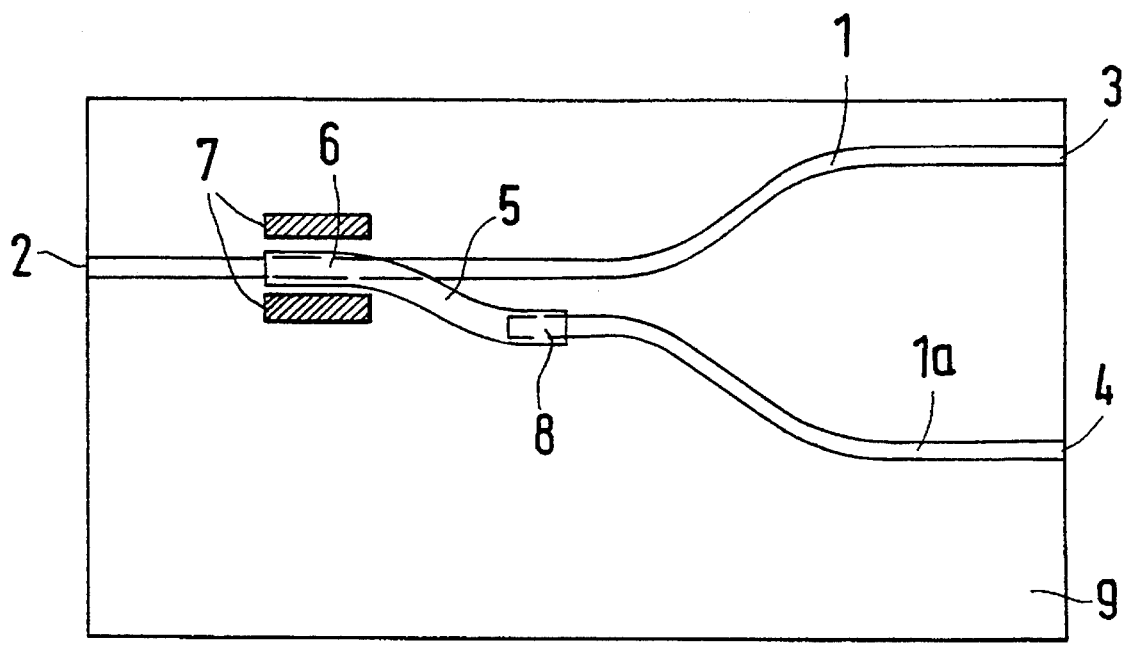
FIG. 1 schematically depicts the optical hybrid switch in a top view.

FIG. 1 shows passive waveguides 1, 1a imbedded in a substrate 9. They form an optical inlet 2 and optical outlets 3 and 4. One of the passive waveguides (1) runs without interruption from optical inlet 2 to optical outlet 3, the other (1a) starts at a fixed adjustment coupler 8 and ends at optical outlet 4. The fixed adjustment coupler 8 forms the end of an optically nonlinear waveguide structure 5 that consists of NLO-polymer e.g., and is coupled by a controllable coupler 6 to the passive waveguide coming from the optical inlet. The controllable coupler is voltage-loaded by lateral electrodes 7 and couples a portion of the optical energy radiated from the optical inlet of the passive waveguide 1 to the active waveguide structure 5, where this portion is a function of the length of coupler 6 and the applied voltage.

When the circuit is operating, nearly the entire optical energy from inlet 2 is supplied to either outlet 3 or outlet 4. While the low attenuation of the passive optical waveguide only takes place on the way to outlet 3, the fight coupled to outlet 4 is attenuated in couplers 6 and 8 and in the waveguide structure 5. With an extremely short configuration of the waveguide structure, there is still a 50 to 70% reduction of the attenuation, as opposed to known optical switches operating on a NLO basis. This is based on coupler lengths of about 5 mm and a length of 1 mm for the waveguide structure in between.

Figure 2:
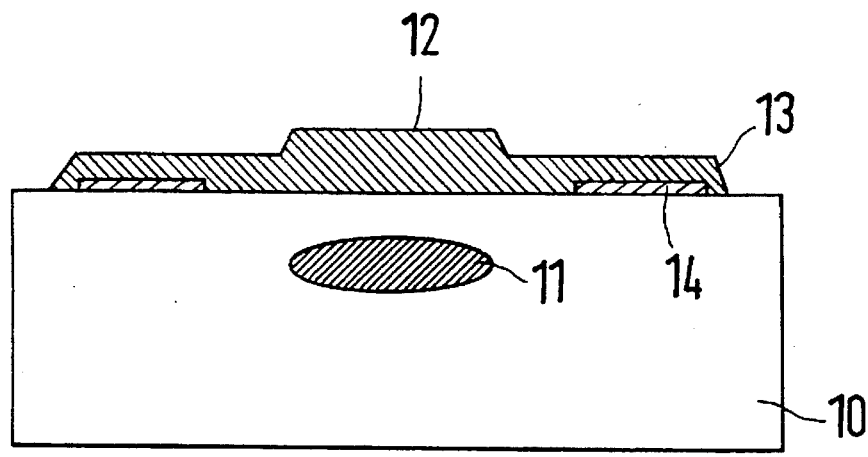
FIG. 2 depicts a controllable vertical coupler.

FIG. 2 depicts a passive optical waveguide 11, which can consist e.g. of glass with a high index of refraction, imbedded in a substrate 10, e.g. a glass substrate with a low index of refraction. A ribbed waveguide structure 12 made of an optically nonlinear material, e.g. a NLO-polymer, is located on the substrate 10. Electrodes 14, for producing an electrical field in the range of the optically nonlinear material, are located on both sides of the ribbed waveguide. They are located directly on the substrate 10 and are covered by the lateral areas 13 of the ribbed waveguide. The electrodes 14 are also used for the polarity of the NLO-polymer in the center of the ribbed waveguide.

We claim:

1. An optical hybrid switch for the voltage-controlled switching of light of the visible or nonvisible spectrum received via an incoming passive waveguide to at least one of two outgoing passive waveguides, comprising an electrooptically active waveguide structure deposited on a substrate and coupled to the passive waveguides and containing at least one coupler which is adjustable by applying a voltage and acts as an optical switch, characterized in that the incoming passive optical waveguide (1) continues without interruption as one of the outgoing waveguides, and that the electrooptically active waveguide structure (5) combines, on the one hand, with the continuous passive optical waveguide (1) to form a coupler (6) adjustable by applying a voltage and acting as an optical switch and, on the other hand, with the other outgoing waveguide (1a) to form a fixed coupler (8), and that the passive waveguides (1, 1a) are embedded in the substrate (9, 10), and that the electrooptically active structure (5) is deposited on the substrate (9, 10) as a rib waveguide (12) and arranged so that in areas where couplers (6, 8) are to be formed, it extends above the passive optical waveguide (1, 1a), and that in areas in which adjustable couplers (6) are to be formed, it is additionally flanked by coplanar electrodes (14).

2. An optical hybrid switch as claimed in claim 1, characterized in that it is used within a plurality of further optical hybrid switches of the same kind which are connected together in a cascade-like configuration.

3. An optical hybrid switch for the voltage-controlled switching of light of the visible or nonvisible spectrum received via an incoming passive optical waveguide (1) to at least one of two outgoing passive waveguides (1, 1a), comprising an electrooptically active waveguide structure deposited on a substrate and coupled to the passive waveguides and containing at least one coupler which is adjustable by applying a voltage and acts as an optical switch, characterized in that the incoming passive optical waveguide (1) continues without interruption as one of the outgoing waveguides, and that the electrooptically active waveguide structure (5) is made of NLO polymer and combines at one end thereof with the continuous passive optical waveguide (1) to form a coupler (6), said optical hybrid switch further comprising a pair of electrodes (7, 14) in proximity to coupler (6) so that the coupler (6) is adjustable by applying a voltage across said electrodes and thereby acting as an optical switch and, wherein the electrooptically active waveguide structure at the other end thereof terminates with the other outgoing waveguide (1a) to form a fixed coupler (8), and wherein the length of the elecytrooptically active waveguide structure between the portions forming coupler (6) and coupler (8) is shorter than the portion of said waveguide structure used to form coupler (6).

4. An optical hybrid switch as claimed in claim 3, characterized in that the passive optical waveguides and the electrooptically active structure are embedded in the substrate and lie in the same plane, and that electrodes are provided above and below the optically active structure.

5. An optical hybrid switch as claimed in claim 4, characterized in that it is used within a plurality of further optical hybrid switches of the same kind which are connected together in a cascade-like configuration.

6. An optical hybrid switch as claimed in claim 3, characterized in that the passive waveguides (1, 1a) are embedded in the substrate (9, 10), and that the electrooptically active structure (5) is deposited on the substrate (9, 10) as a rib waveguide (12) and arranged so that in areas where couplers (6, 8) are to be formed, it extends above the passive optical waveguide (1, 1a), and that in areas in which adjustable couplers (6) are to be formed, it is additionally flanked by coplanar electrodes (14).

7. An optical hybrid switch as claimed in claim 3, characterized in that it is used within a plurality of further optical hybrid switches of the same kind which are connected together in a cascade-like configuration.

8. An optical hybrid switch as claimed in claim 3, wherein the lengths of elecyrooptically active waveguide structure (5) to form the couplers (6 and 8) is approximately 5 mm and the length of said waveguide structure between couplers (6 and 8) is approximately 1 mm.

\* \* \* \* \*

UNITED STATES PATENT AND TRADEMARK OFFICE
CERTIFICATE OF CORRECTION

PATENT NO. : 5,465,310
DATED : November 7, 1995
INVENTOR(S) : Peter Kersten
Klause-D. Matthies It is certified that error appears in the above-indentified patent and that said Letters Patent is hereby corrected as shown below:

On the title page: Item [54] and Col. 1,

Line 2, "ELECTROPTICALLY" should be --ELECTROOPTICALLY--

Line 3, "FORMEDFROM" should be --FORMED FROM--.

Signed and Sealed this

Thirteenth Day of February, 1996

Attest:

BRUCE LEHMAN

Attesting Officer        Commissioner of Patents and Trademarks